(12) United States Patent
Clemen

(10) Patent No.: US 9,206,766 B2
(45) Date of Patent: Dec. 8, 2015

(54) JET ENGINE DEVICE WITH A BYPASS DUCT

(75) Inventor: Carsten Clemen, Mittenwalde (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 946 days.

(21) Appl. No.: 13/409,919

(22) Filed: Mar. 1, 2012

(65) Prior Publication Data

US 2012/0222396 A1 Sep. 6, 2012

(30) Foreign Application Priority Data

Mar. 4, 2011 (DE) .......................... 10 2011 013 076

(51) Int. Cl.
*F02C 7/20* (2006.01)
*F02K 3/06* (2006.01)
*F01D 25/16* (2006.01)

(52) U.S. Cl.
CPC ............... *F02K 3/06* (2013.01); *F01D 25/162* (2013.01)

(58) Field of Classification Search
CPC .......... F05D 2250/323; F05D 2220/36; F05D 2240/12; B64D 29/00–29/04; B64D 27/10–27/20; B64D 33/02; B64D 33/04; F02K 1/78; F01D 9/041; F01D 9/06; F01D 9/00
See application file for complete search history.

(56) References Cited

U.S. PATENT DOCUMENTS

| | | | |
|---|---|---|---|
| 3,750,983 A | 8/1973 | Morris | |
| 4,458,863 A | 7/1984 | Smith | |
| 4,732,532 A * | 3/1988 | Schwaller et al. | ............. 415/119 |
| 4,785,625 A * | 11/1988 | Stryker et al. | ................ 60/226.1 |
| 5,076,049 A | 12/1991 | Von Benken et al. | |
| 5,174,525 A | 12/1992 | Schilling | |
| 5,642,615 A | 7/1997 | Porte et al. | |
| 7,806,363 B2 | 10/2010 | Udall et al. | |
| 2002/0141863 A1 * | 10/2002 | Liu et al. | ......................... 415/192 |
| 2006/0038066 A1 | 2/2006 | Udall et al. | |
| 2007/0246603 A1 * | 10/2007 | Udall et al. | ...................... 244/54 |
| 2010/0290903 A1 * | 11/2010 | Heyerman et al. | .......... 415/213.1 |
| 2011/0016883 A1 | 1/2011 | Clemen | |
| 2011/0168837 A1 * | 7/2011 | Balk et al. | ......................... 244/54 |
| 2012/0051903 A1 * | 3/2012 | Heyerman et al. | .......... 415/213.1 |
| 2012/0111023 A1 * | 5/2012 | Sjoqvist | ........................... 60/797 |

FOREIGN PATENT DOCUMENTS

| | | |
|---|---|---|
| DE | 69612898 | 12/2001 |
| DE | 102009034530 | 1/2011 |

OTHER PUBLICATIONS

German Search Report dated Jan. 18, 2012 from counterpart application.

* cited by examiner

*Primary Examiner* — Craig Kim
*Assistant Examiner* — Kayla McCaffrey
(74) *Attorney, Agent, or Firm* — Timothy J. Klima; Shuttleworth & Ingersoll, PLC

(57) ABSTRACT

A jet engine has a bypass duct limited by an inner wall and an outer wall and inside which a fluid flows. Between the inner and outer walls of the bypass duct a support unit is provided that includes strut-like support elements connected at opposite ends to the inner and outer walls, respectively. Central longitudinal planes of the support elements describe in the areas of the support elements facing the inner wall a positive acute angle with an engine axis, and in the areas of the support elements facing the outer wall a negative acute angle with the engine axis. Flow cross-sections are each enlarged in the area between the side surfaces of the support elements each describing an acute angle with the walls, starting from the areas facing the fluid flow in the direction of the areas of the support elements facing away from the fluid flow.

20 Claims, 5 Drawing Sheets

JET ENGINE DEVICE WITH A BYPASS DUCT

Figure 1:
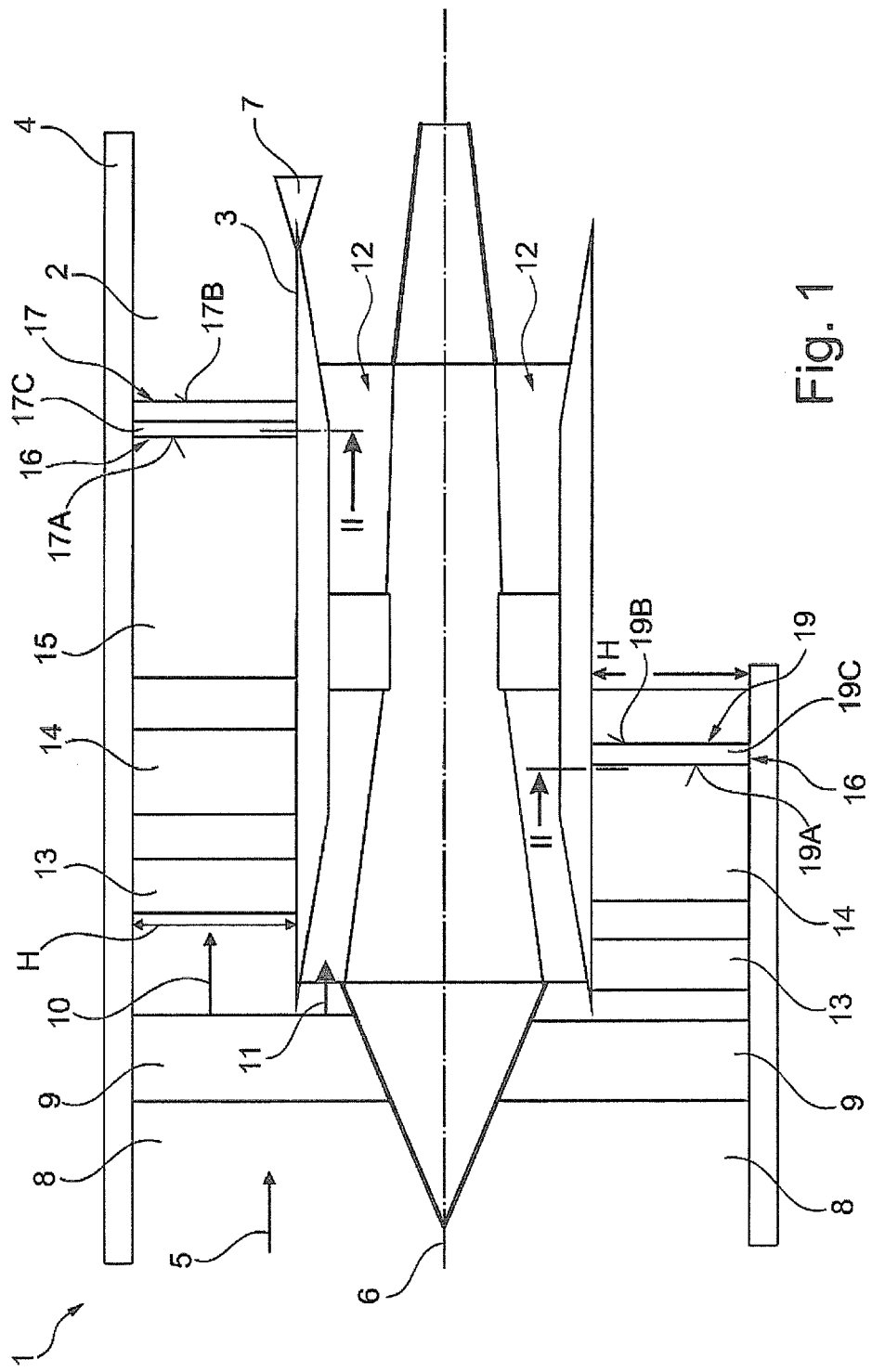

This application claims priority to German Patent Application DE102011013076.4 filed Mar. 4, 2011, the entirety of which is incorporated by reference herein.

The invention relates to a jet engine device with a bypass duct.

A jet engine device is known from US 2006/0038066 A1 with a bypass duct inside which a fluid flow can be guided. The bypass duct is limited by an inner wall and by an outer wall. Between the inner wall and the outer wall of the bypass duct, a support unit is provided that includes strut-like support elements connected at one end to the inner wall and at the other end to the outer wall. The support elements each describe an acute angle between a first side surface, which passes between an area facing a direction of the fluid flow in the bypass duct and an area of a support element facing away from the direction of the fluid flow, and the outer wall, and between a second side surface, which passes between the area facing the fluid flow in the bypass duct and the area of a support element facing away from the fluid flow, and the inner wall. Furthermore, the support elements are each designed with a thickness distribution defined relative to their central longitudinal plane along the central longitudinal plane.

The support elements are provided in the rear part of the bypass duct, relative to the flow direction of the fluid flow inside the bypass duct, for transmission of engine loads acting in the area of an engine core in the direction of the outer wall, and in each case are connected in pairs in a manner forming an A-arrangement to the inner wall and the outer wall and level in the bypass duct with the duct height.

Due to the arrangement of the support elements positioned relative to the duct height inside the bypass duct, a flow cross-section available for the fluid flow flowing in the bypass duct, in particular in the linkage areas of the support elements on the inner wall and on the outer wall, especially in the area of the acute angles each described by the support elements and the walls, is limited such that in the area of the reduced-size flow cross-sections an uneven flow field is caused and the support elements are not flowed around symmetrically in the required manner. Undesirably high losses, which increase engine fuel consumption, result from the uneven flow field around the support elements when compared to a symmetrical flow around the support elements.

The object of the present invention is therefore to provide a jet engine device with a bypass duct and with support elements provided between an inner wall and an outer wall of the bypass duct, where the engine fuel consumption is reduced compared to the jet engine devices known from the prior art.

In the jet engine device in accordance with the invention with a bypass duct limited by an inner wall and an outer wall and inside which a fluid flow can be guided, a support unit is provided between the inner wall and the outer wall of the bypass duct and includes strut-like support elements connected at one end to the inner wall and at the other end to the outer wall. The support elements each describe an acute angle between a first side surface which passes between an area facing a direction of the fluid flow in the bypass duct and an area of a support element facing away from the direction of the fluid flow, and the outer wall, and between a second side surface, which passes between the area facing the fluid flow in the bypass duct and the area of a support element facing away from the fluid flow, and the inner wall. In addition, the support elements are each designed with a thickness distribution defined along the central longitudinal plane relative to their central longitudinal plane.

In accordance with the invention, the central longitudinal planes of the support elements describe in the areas of the support elements facing the inner wall a positive acute angle with an engine axis, and in the areas of the support elements facing the outer wall a negative acute angle with the engine axis, so that flow cross-sections are each enlarged in the area between the side surfaces each describing an acute angle with the walls, starting from the areas facing the fluid flow in the direction of the areas of the support elements facing away from the fluid flow.

Thus an uneven flow field, particularly in the areas of the support elements close to the linkage areas on the inner wall and the outer wall, and a resultant overall pressure loss in the area of the support elements compared with jet engine devices known from the prior art, is minimized by a simple design, and the jet engine device in accordance with the invention can be operated with low engine fuel consumption.

The support elements are for that purpose designed in defined areas, i.e. at least in the areas facing the linkage areas between the support elements and the inner wall and the outer wall of the bypass duct, with a staggered profile preferably with a helical twist, by means of which a low overall pressure loss is achieved compared to jet engine devices known from the prior art.

In an advantageous embodiment of the jet engine device in accordance with the invention, the values of the acute angles between the central longitudinal plane of a support element and the engine axis vary depending on the values of the acute angles between the side surfaces of the support element and the walls of the bypass duct. This ensures that the overall pressure loss, which generates a higher engine fuel consumption and is caused by a cross-sectional reduction in the area of the linkage areas of the support elements to the inner wall and to the outer wall, depending on the specific application, is reduced to a minimum.

If the values of the acute angles between the central longitudinal plane of a support element and the engine axis increase as the values of the acute angles between the side surfaces of the support elements and the walls decrease, the overall pressure loss due to an even flow around the support elements is reduced to the required extent, depending on the application, compared to jet engine devices known from the prior art.

If the central longitudinal planes of the support elements are each aligned parallel to the engine axis in a central area of the support elements between the areas facing the walls, an even flow field around the support elements ensuring a low overall pressure loss is achieved in each of the central areas of the support elements with low design effort.

The overall pressure loss caused by the arrangement of the support elements in the bypass duct can be reduced to the required extent when the values of the acute angles between the central longitudinal planes of the support elements and the engine axis have their maximum values in the connecting areas to the walls.

Furthermore, an overall pressure loss occurring compared to the jet engine devices known from the prior art is reduced to the required extent when the values of the acute angles between the central longitudinal planes of the support elements and the engine axis steadily decrease, starting from the connecting areas to the walls in the direction of the central areas, since then a transition between the twisted areas of the support elements facing the walls and the central areas of substantially non-twisted design is created and is favorable for obtaining an even flow field around the support elements.

In an advantageous embodiment of the jet engine device in accordance with the invention, the acute angles between the central longitudinal planes of the support elements and the engine axis, starting from the connecting areas to the inner wall in the direction of the central areas, have values between max. 10° and 0° in order to reduce the overall pressure loss to the required extent.

If the acute angles between the central longitudinal planes of the support elements and the engine axis, starting from the connecting areas to the outer wall in the direction of the central areas, have values between max. 15° and 0°, the overall pressure loss can also be minimized to the required extent.

The overall pressure loss occurring due to the flow around the support elements is, in a further advantageous embodiment of the jet engine device in accordance with the invention, reduced in that those areas of the support elements facing the walls, of which the central longitudinal planes each describe an acute angle with the engine axis, extend at least up to 10% and at most up to 30% of a duct height of a bypass duct, starting from the linkage areas of the support elements on the walls.

In a further advantageous embodiment of the jet engine device in accordance with the invention, two support elements each are connected in a manner forming an A-arrangement to the inner wall and to the outer wall, in order to support engine loads acting in the area of the inner wall with high efficiency in the area of the outer wall, where the twist in accordance with the invention of the support elements in the areas facing the walls likewise creates an even flow field between the support elements forming an A-arrangement, since each two support elements arranged obliquely to one another no longer aerodynamically influence each other and are flowed around evenly to the required extent.

In an advantageous development of the jet engine device in accordance with the invention, the values of the acute angles between the side surfaces of the support elements and the inner wall, and the values of the acute angles between the side surfaces of the support elements and the outer wall, are in each case identical, so that the support elements can be manufactured inexpensively by identically structured production processes.

The support elements can, in a further advantageous embodiment in which the values of the acute angles between the central longitudinal planes of the support elements and the engine axis are identical, also be manufactured inexpensively.

If the support elements each have an elliptical cross-section in a cross-sectional plane perpendicular to the central longitudinal plane, the overall pressure loss occurring due to the arrangement of the support elements in the bypass duct can also be reduced to a minimum due to the flow-favoring cross-sectional shape of the support elements.

The features set forth in the following exemplary embodiments of the jet engine device in accordance with the invention are, singly or in any combination with each other, suitable for developing the subject matter in accordance with the invention. The respective feature combinations do not represent any restriction on further development of the subject matter in accordance with the invention, but have substantially only an exemplary character.

Further advantages and advantageous embodiments of the jet engine device in accordance with the invention become apparent from the exemplary embodiments of which the principles are described in the following with reference to the drawings.

Figure 2:
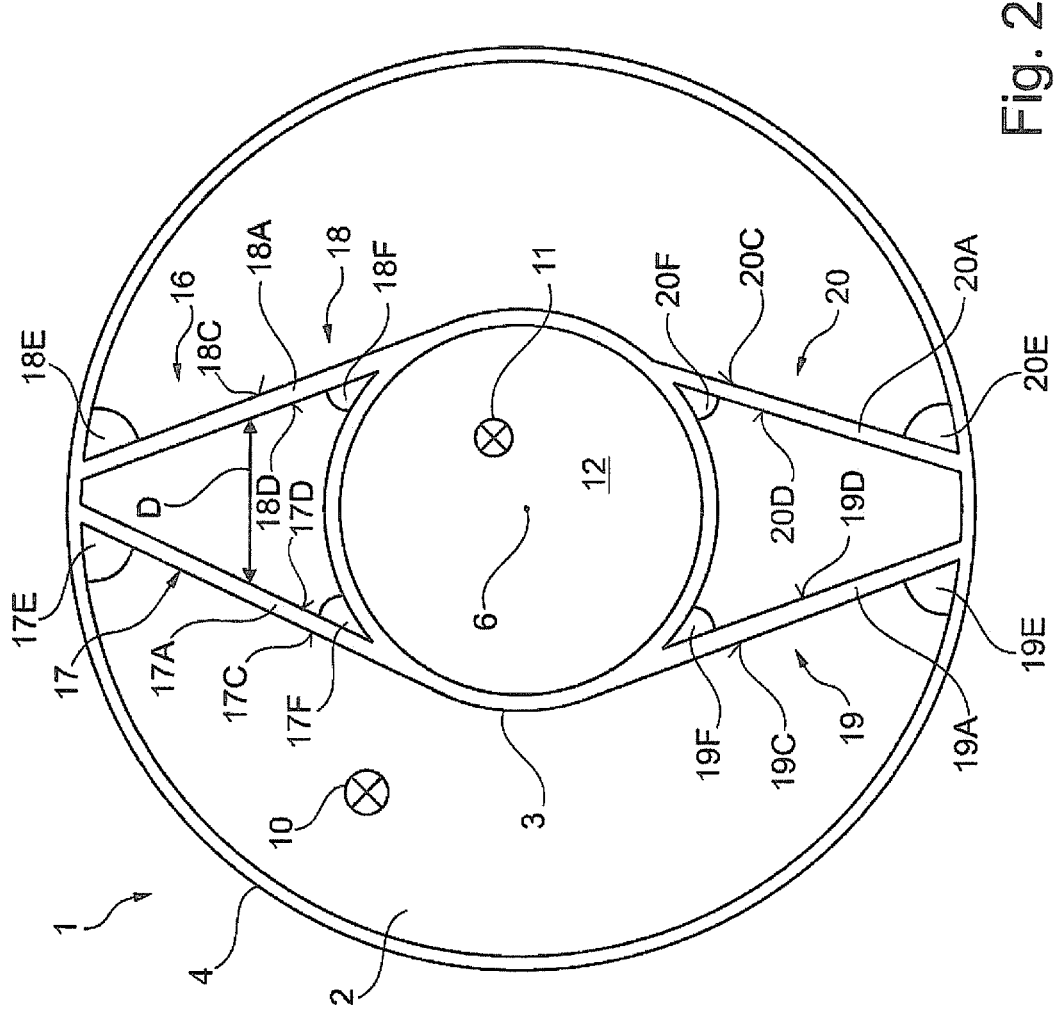
Figure 3:
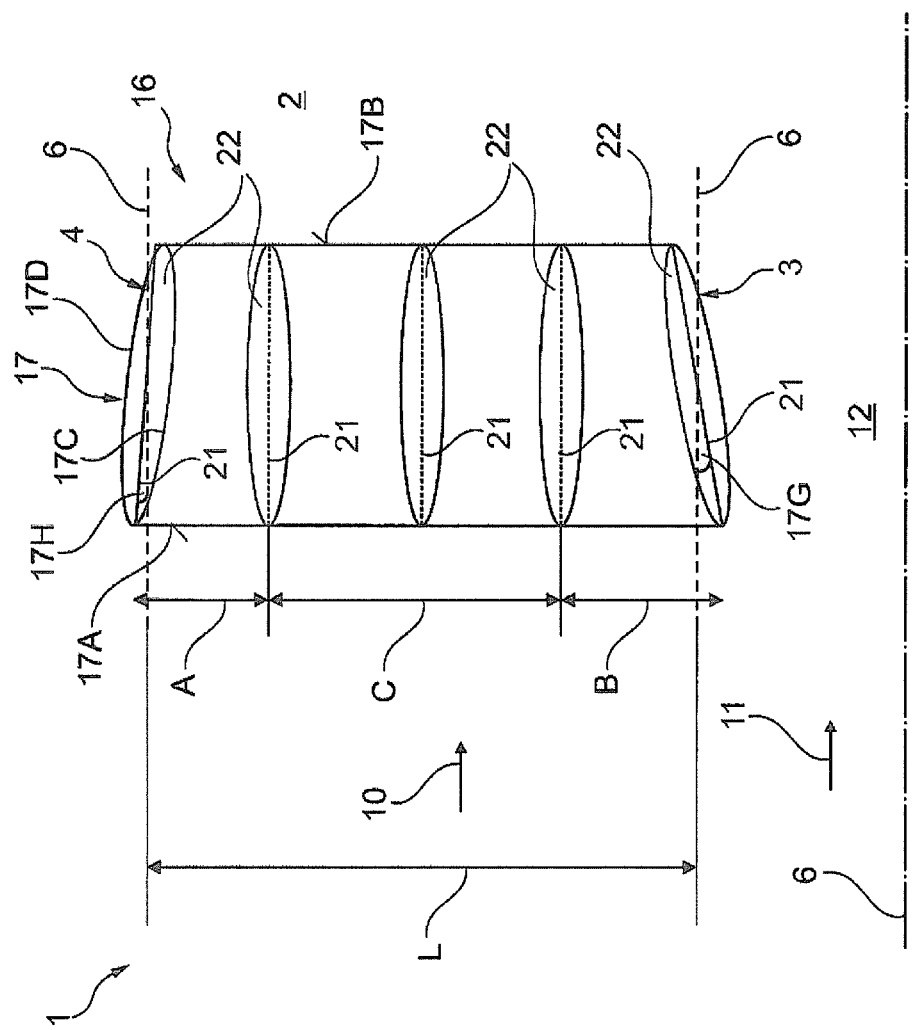
Figure 4:
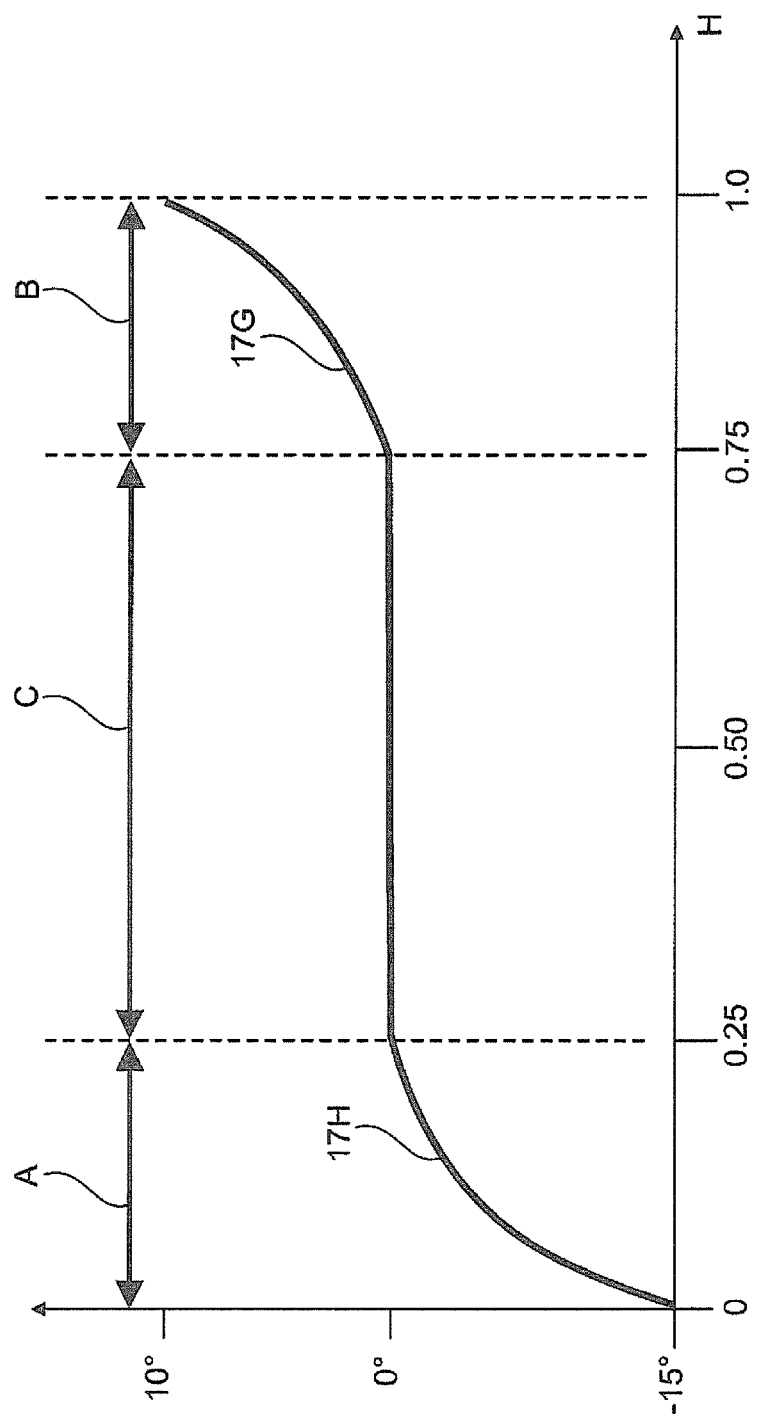
Figure 5:
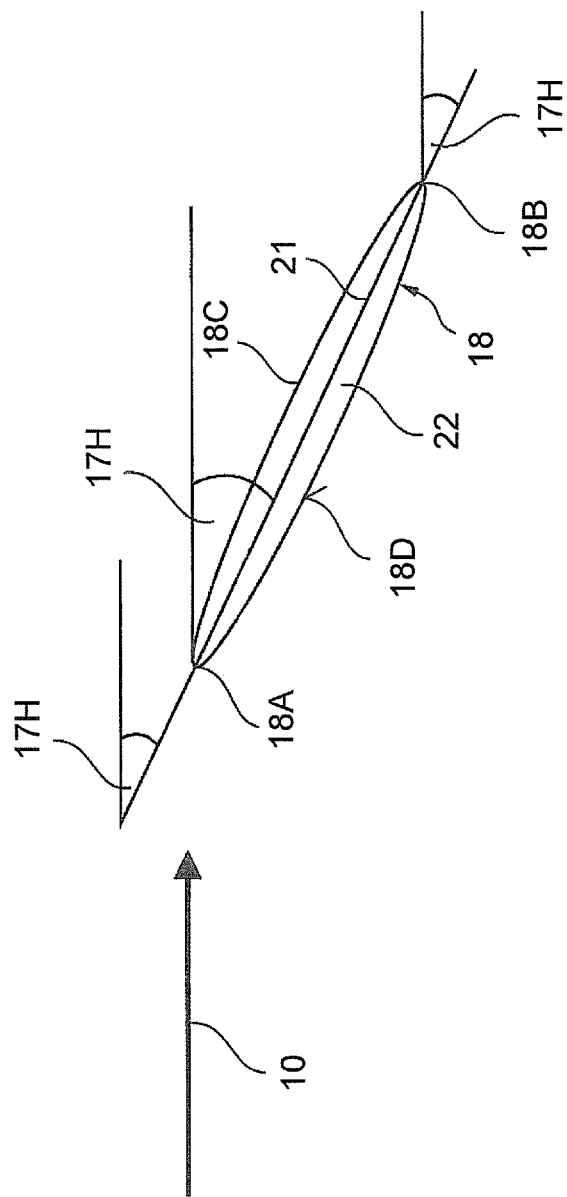

In the drawings,

FIG. 1 shows a highly schematized longitudinal sectional view of two different embodiments of the jet engine device in accordance with the present invention, representing a turbofan engine with bypass duct, core flow and a mixer for mixing the core flow with the bypass flow and an embodiment without mixing core flow and bypass flow, FIG. 2 shows a cross-sectional view of the jet engine device in accordance with FIG. 1 from a view II shown in more detail in FIG. 1, FIG. 3 shows a simplified schematic view of a support element of the jet engine device as per FIG. 1, FIG. 4 shows a development of an acute angle between a central longitudinal plane of the support element as per FIG. 3 over a duct height of the bypass duct of the jet engine device as per FIG. 1, and FIG. 5 shows a cross-sectional view of one of the support elements as per FIG. 2 in a connecting area of the support element to an outer wall of the bypass duct of the jet engine device as per FIG. 1.

FIG. 1 shows a longitudinal sectional view of two different embodiments of a jet engine device 1 representing a turbofan engine, with a bypass duct 2 limited by an inner wall 3 and an outer wall 4 and in which a fluid flow 5 can be guided. The first embodiment of the jet engine device 1 is shown above an engine axis 6 which at the same time represents a symmetry axis of the jet engine device 1, which in comparison to the second embodiment of the jet engine device 1 shown underneath the engine axis 6 in FIG. 1 is additionally provided with a mixer 7 for mixing a core flow 11 guided inside the inner wall 3 with the fluid flow 10 guided inside the bypass duct 2 or in the bypass flow, respectively, for formation of a mixed jet.

Both embodiments of the jet engine device 1 are designed with an inlet area 8 adjoined downstream in a manner known per se by a fan 9. The fluid flow 5 again splits downstream of the fan 9 into the bypass flow 10 and the core flow 11, where the bypass flow 10 flows through the bypass duct 2 and the core flow 11 into an engine core 12 which again in a manner known per se but not illustrated in detail in the drawing is designed with a compressor unit, a combustion chamber and a turbine. The inner wall 3 represents here a housing of the engine core 12, while the outer wall 4 forms the outer engine cowling.

In the bypass duct 2, several fan outlet guide vanes 13 are arranged downstream of the fan 9 which reduce or remove a twist in the flow of the bypass flow 10. In addition, supports 14 are provided downstream of the fan outlet guide vanes 13, bracing the inner wall 3 and the outer wall 4 against one another. In addition to the supports 14, the upper embodiment of the jet engine device 1 has, downstream of the supports 14, so-called bifurcations 15 through which lines are routed for supplying the jet engine device 1 or an airframe of an aircraft provided with the jet engine device 1.

Depending on the specific application, it is also possible for the bifurcations 15 to be arranged in the same cross-sectional plane as the supports 14.

A support unit 16 each is provided in the rear part of the bypass duct 2, downstream of the supports 14 or the bifurcations 15, in both embodiments of the jet engine device 1 and includes strut-like support elements 17 to 20 shown in more detail in FIG. 2 and connected at one end to the inner wall 3 and at the other end to the outer wall 4. The support elements 17 to 20 each describe an acute angle 17E to 20E or 17F to 20F, respectively, between a first side surface 17C to 20C, which passes between an area 17A to 20A facing upstream or toward the fluid flow 10 in the bypass duct 2 and an area 17B, 19B of the support elements 17 to 20 facing downstream or away from the fluid flow 10, and the outer wall 4, and between a second side surface 17D to 20D, which passes between the area 17A to 20A facing the fluid flow 10 in the bypass duct 2 and the area 17B, 19B of the support elements 17 to 20 facing away from the fluid flow 10, and the inner wall 3. Each two of the support elements 17 and 18 or 19 and 20, respectively, are connected in a manner forming an A-arrangement to the inner wall 3 and to the outer wall 4 in the manner shown in more detail in FIG. 2 and form so-called A-frames of the support unit 16.

The support elements 17 and 18 or 19 and 20, respectively, representing A-frames level in the bypass duct 2 with a duct height H in order to transmit engine loads acting in the area of the engine core 12 outwards in the direction of the outer wall 4. The support elements 17 and 18 or 19 and 20, respectively, assigned to one another in pairs are, depending on the specific application, arranged relative to one another at a defined acute angle 17F, 18F or 19F, 20F, respectively, and at a distance D defined in the circumferential direction. Furthermore, the support elements 17 to 20 are designed with aerodynamically shaped cross-sectional profiles which when radially stacked one above the other determine the shape of the A-frame or support unit 16. The support elements 17 to 20 of the support unit 16 here have no curvature relative to the engine axis 6 and are designed relative to a central longitudinal plane 21 with a thickness distribution forming the defined profiling in the manner shown in more detail in FIG. 3, where the support elements 17 to 20 each have an elliptical and hence aerodynamically optimized cross-sectional profile in a cross-sectional plane 22 perpendicular to the central longitudinal plane 21.

Due to the oblique arrangement of the support elements 17 to 20 in the bypass duct 2 over the duct height H of the bypass duct 2, a flow cross-section for the bypass flow 10, in particular in the connecting areas of the support elements 17 to 20 to the inner wall 3 and to the outer wall 4, especially in the areas of the support elements 17 to 20 describing the acute angles 17E to 20E and 17F to 20F with the walls 3 and 4, is restricted compared to the flow cross-section of the bypass duct 2 upstream of the support elements 17 to 20. To obtain an even flow field around the support elements 17 to 20, the central longitudinal planes 21 of the support elements 17 to 20 are twisted to respectively form a positive acute angle 17G with the engine axis 6 in the areas B facing the inner wall 3, and a negative acute angle 17H with the engine axis 6 in the areas A of support elements 17 to 20 facing the outer wall 4. As a result, the flow cross-sections are enlarged in the area between the side surfaces 17A to 20A or 17B to 20B, respectively, describing acute angles 17E to 20E and 17F to 20F with the walls 3 and 4, starting from the areas 17A to 20A facing the fluid flow 10 in the direction of the areas 17B, 19B of the support elements 17 to 20 facing away from the fluid flow 10.

Furthermore, the central longitudinal planes 21 of the support elements 17 to 20 are each aligned parallel to the engine axis 6 in a central area C of the support elements 17 to 20 arranged between the areas A and B facing the walls 3 and 4. Hence the support elements 17, 18 are for example each designed in the areas A and B facing the walls 3 and 4 with an opposite-direction twist, and in the central areas C without twist relative to the engine axis 6 or to the fluid flow 10 in the bypass duct 2, in order to generate over the entire length L of the support elements 17 to 20 an even flow field around the support elements 17 to 20 and reducing an overall pressure loss.

With the partial twist of the support elements 17 to 20 relative to the entire axial length L of the support elements 17 to 20, the flow cross-sections between the support elements 17 to 20 and the walls 3 and 4 are in a simple design enlarged to the required extent in the area of the acute angles 17E to 20E and 17F to 20F when compared to the jet engine devices known from the prior art, which are likewise designed with a support unit 16 or so-called A-frames, in order to generate the even flow field around the support elements 17 to 20.

Here the twist of the support elements 17 and 18 or 19 and 20, respectively, assigned to one another in the areas A facing the outer wall 4 is such that the flow cross-sections between the support elements 17 and 18 or 19 and 20, respectively, along the flow direction 10 in the bypass duct 2 are reduced by the areas A of the support elements 17 and 18 or 19 and 20, respectively, and the flow cross-sections limited in the area of the acute angles 17E and 18E or 19E and 20E, respectively, by the support elements 17 and 18 or 19 and 20, respectively, and the outer wall 4, are enlarged.

At the same time, the twist of the support elements 17 and 18 or 19 and 20, respectively, in the areas B facing the inner wall 3 is such that the flow cross-sections limited by the areas B of the support elements 17 and 18 or 19 and 20, respectively, and the inner wall 3 are enlarged in the area of the acute angles 17F and 18F or 19F and 20F, respectively, in the flow direction 10 inside the bypass duct 2, while the flow cross-sections limited by the side surfaces 17C and 18C or 19C and 20C, respectively, and the walls 3 and 4 are reduced by the twist of the areas B.

Depending on the specific application, the areas A and B of the support elements 17 to 20 extend, starting from the wall 4 or 3, to at least 10% and at most 30% of the duct height H of the bypass duct 2 in the direction of the wall 3 or 4. The values of the acute angles 17G and 17H between the central longitudinal planes 21 of the support elements 17 to 20 and the engine axis 6 have their maximum values in the connecting areas to the walls 3 and 4 in the manner shown in FIG. 4. In addition, the values of the acute angles 17G and 17H between the central longitudinal planes 21 of the support elements 17 to 20 and the engine axis 6 steadily decrease starting from the connecting areas to the walls 3 and 4 in the direction of the central areas C.

It is therefore provided, to generate an even flow field around the support elements 17 to 20, that the values of the acute angles 17G in the areas B between the central longitudinal planes 21 of the support elements 17 to 20 and the engine axis 6, starting from the connecting areas to the inner wall 3 in the direction of the central areas C, amount to between max. 10° and 0°, while the values of the acute angles 17H in the areas A between the central longitudinal planes 21 of the support elements 17 to 20 and the engine axis 6, starting from the connecting areas to the outer wall 4 in the direction of the central areas C, amount to between max. 15° and 0°. It is additionally provided that the values of the acute angles 17G and 17H between the central longitudinal planes 21 of the support elements 17 to 20 and the engine axis 6, and hence the twist degrees in the areas A and B are in each case identical over the extent of the areas A and B.

FIG. 5 shows a simplified plan view onto the support element 18 and the maximum twist of the support element 18 provided relative to the engine axis 6, about the acute angle 17H in the connecting area of the support element 18 to the outer wall 4. Due to the staggering of the support element 18 as shown in FIG. 5, which in all support elements 17 to 20 is of the same extent as regards the value, a defined entry angle 17H and an identical exit angle 17H are achieved for the fluid flow 10 in the bypass duct 2 in the area of the support elements 17 to 20. This means that the staggering present in the areas A and B of the support elements 17 to 20 is generated by a stagger angle 17G or 17H, respectively, diverging from 0° relative to the engine axis 6. In the transitional areas between the areas A and B and the central areas C of the support elements 17 to 20, the stagger angles 17G and 17H equal zero.

Between the walls 3 and 4 and the area limits between the areas A and B and the central areas C, the stagger angles or acute angles 17G and 17H run steadily between the maximum wall value and 0°, where the stagger angles 17G and 17H in the area of each cross-sectional plane 22 of the support elements 17 to 20 are identical respectively to the entry and exit angles of the fluid flow 10 in the area of the support elements 17 to 20 in the bypass duct 2.

In the jet engine device in accordance with the invention, due to the enlargement of the flow cross-sections close to the support elements, a flow from a mutual interference of two each support elements assigned to one another and forming a so-called A-frame, depending on their distance apart and on their mutual inclination angle, is also taken into account and a suitable design is provided for each combination of these parameters in which the A-frames receive in a defined area staggered profiles by means of which a low overall pressure loss is achieved.

LIST OF REFERENCE NUMERALS

1 Jet engine device
2 Bypass duct
3 Inner wall
4 Outer wall
5 Fluid flow
6 Engine axis
7 Mixer
8 Inlet area
9 Fan
10 Bypass flow
11 Core flow
12 Engine core
13 Fan outlet guide vanes
14 Support
15 Bifurcation
16 Support unit
17 to 20 Support element
17A to 20A Area of support element facing the fluid flow
17B, 18B, 19B Area of support element facing away from the fluid flow
17C to 20C Side surface of support element
17D to 20D Side surface of support element
17E to 20E Acute angle
17F to 20F Acute angle
17G, 17H Acute angle between central longitudinal plane and engine axis
21 Central longitudinal plane
22 Cross-sectional plane
A to C Area of support element
D Distance between two support elements
H Duct height of bypass duct
L Axial length of support element

What is claimed is:

1. A jet engine device comprising:
a bypass duct limited by an inner wall and an outer wall and inside which a fluid flow can be guided;
a support unit positioned between the inner wall and the outer wall of the bypass duct and including strut-like support elements connected at one end to the inner wall and at another end to the outer wall;
each of the support elements forming acute angles between:
the outer wall and a first side surface of the support element extending between upstream and downstream facing portions of the support element, and
the inner wall and a second side surface of the support element extending between the upstream and downstream facing portions of the support element;
each support element having a plurality of cross-sectional profiles defined by a plurality of parallel cross-sectional planes extending in a direction of the fluid flow, the cross-sectional profiles positioned consecutively along a length of the support element from an inner wall end to an outer wall end of the support element, the cross-sectional profiles being perpendicular to a central longitudinal line extending along the length of the support element, the cross-sectional profiles defining a thickness distribution of the support element along the central longitudinal line, chord lines of certain ones of the cross-sectional profiles in an area of the support element adjacent the inner wall forming a positive acute angle with an engine axis, chord lines of other ones of the plurality of cross-sectional profiles in an area of the support element adjacent the outer all forming a negative acute angle with the engine axis, thereby enlarging flow cross-sections in the acute angle areas adjacent the inner and outer walls.

2. The jet engine device of claim 1, wherein values of the acute angles between the chord lines of the cross-sectional profiles and the engine axis varies depending on values of the acute angles between the side surfaces of the support element and the inner and outer walls.

3. The jet engine device of claim 2, wherein the values of the acute angles between the chord lines of the cross-sectional profiles and the engine axis increase as the values of the acute angles between the side surfaces and the inner and outer walls decrease.

4. The jet engine device of claim 3, wherein the chord lines of the cross-sectional profiles are each aligned parallel to the engine axis in central areas of the support elements between the areas adjacent the inner and outer walls.

5. The jet engine device of claim 4, wherein the values of the acute angles between the chord lines of the cross-sectional profiles and the engine axis are at a maximum in connecting areas to the inner and outer walls.

6. The jet engine device of claim 5, wherein the values of the acute angles between the chord lines of the cross-sectional profiles and the engine axis steadily decrease, starting from the connecting areas to the walls and moving in a direction of the central areas.

7. The jet engine device of claim 6, wherein the values of the acute angles between the chord lines of the cross-sectional profiles and the engine axis, starting from the connecting areas to the inner wall in the direction of the central areas, range between max. 10° and 0°.

8. The jet engine device of claim 7, wherein the values of the acute angles between the chord lines of the cross-sectional profiles and the engine axis, starting from the connecting areas to the outer wall in the direction of the central areas, range between max. −15° and 0°.

9. The jet engine device of claim 8, wherein the areas of the support elements adjacent the inner and outer walls, of which the chord lines of the cross-sectional profiles each describe an acute angle with the engine axis, extend at least up to 10% and at most up to 30% of a duct height of the bypass duct, starting from the connecting areas of the support elements to the inner and outer walls.

10. The jet engine device of claim 9, wherein two support elements each are connected in a manner forming an A-arrangement to the inner wall and to the outer wall.

11. The jet engine device of claim 10, wherein the values of the acute angles between the side surfaces of the support elements and the inner wall, and the values of the acute angles between the side surfaces of the support elements and the outer wall, are identical.

12. The jet engine device of claim 11, wherein maximum values of the positive and negative acute angles between the chord lines of the cross-sectional profiles and the engine axis are identical.

13. The jet engine device of claim 12, wherein the cross-sectional profiles are elliptical.

14. The jet engine device of claim 1, wherein the chord lines of the cross-sectional profiles are each aligned parallel to the engine axis in central areas of the support elements between the areas adjacent the inner and outer walls.

15. The jet engine device of claim 14, wherein values of the acute angles between the chord lines of the cross-sectional profiles and the engine axis are at a maximum in connecting areas to the inner and outer walls.

16. The jet engine device of claim 5, wherein the values of the acute angles between the chord lines of the cross-sectional profiles and the engine axis steadily decrease, starting from the connecting areas to the inner and outer walls and moving in a direction toward the central areas.

17. The jet engine device of claim 14, wherein values of the acute angles between the chord lines of the cross-sectional profiles and the engine axis, starting from connecting areas to the inner wall in a direction of the central areas, range between max. 10° and 0°.

18. The jet engine device of claim 14, wherein values of the acute angles between the chord lines of the cross-sectional profiles and the engine axis, starting from connecting areas to the outer wall in a direction of the central areas, range between max. −15° and 0°.

19. The jet engine device of claim 1, wherein the areas of the support elements adjacent the inner and outer walls, of which the chord lines of the cross-sectional profiles each describe an acute angle with the engine axis, extend at least up to 10% and at most up to 30% of a duct height of the bypass duct, starting from connecting areas of the support elements to the inner and outer walls.

20. The jet engine device of claim 1, wherein values of the acute angles between the side surfaces of the support elements and the inner wall, and values of the acute angles between the side surfaces of the support elements and the outer wall, are identical.

\* \* \* \* \*